(12) United States Patent
Kahle et al.

(10) Patent No.: US 8,659,763 B2
(45) Date of Patent: Feb. 25, 2014

(54) METHOD FOR MACHINE MEASUREMENT

(75) Inventors: Lüder Kahle, Viersen (DE); Reinhold Loose, Wegberg (DE); Hermann J. Mirbach, Wegberg (DE); Thomas Troup, Geilenkirchen (DE)

(73) Assignee: Dorries Scharmann Technologie GmbH, Monchengladbach (DE)

( * ) Notice: Subject to any disclaimer, the term of this patent is extended or adjusted under 35 U.S.C. 154(b) by 16 days.

(21) Appl. No.: 13/117,509

(22) Filed: May 27, 2011

(65) Prior Publication Data

US 2011/0292404 A1 Dec. 1, 2011

(30) Foreign Application Priority Data

May 28, 2010 (DE) .......................... 10 2010 021 839

(51) Int. Cl.
*G01B 11/02* (2006.01)

(52) U.S. Cl.
USPC .......................................... 356/508; 356/498

(58) Field of Classification Search
USPC ......... 356/482, 486, 487, 480, 493, 498, 450, 356/496, 500, 508, 510
See application file for complete search history.

(56) References Cited

U.S. PATENT DOCUMENTS

| | | | |
|---|---|---|---|
| 4,561,776 A | 12/1985 | Pryor | |
| 5,808,740 A * | 9/1998 | Tanaka et al. | 356/493 |
| 6,519,043 B1 * | 2/2003 | Wang | 356/614 |
| 6,819,974 B1 * | 11/2004 | Coleman et al. | 700/195 |
| 6,960,052 B2 * | 11/2005 | Lutz et al. | 409/235 |
| 7,364,393 B2 * | 4/2008 | Collingwood et al. | 409/231 |
| 2006/0235636 A1 * | 10/2006 | Madlener et al. | 702/95 |

FOREIGN PATENT DOCUMENTS

| | | | |
|---|---|---|---|
| DE | 2441984 | 3/1975 | |
| DE | 19947374 | 5/2001 | |
| DE | 10029383 | 1/2002 | |
| DE | 10260256 | 7/2004 | |
| DE | 202006006342 | * 8/2006 | ............... G01B 5/00 |
| WO | 2009/030585 | 3/2009 | |

OTHER PUBLICATIONS

German Search Report, dated Feb. 20, 2011, in parent case, DE 10 2010 021 839.1, related to this matter, U.S. Appl. No. 13/117,509, 4 pages.

* cited by examiner

*Primary Examiner* — Gregory J Toatley
*Assistant Examiner* — Hina F Ayub
(74) *Attorney, Agent, or Firm* — Pauly, Devries Smith & Deffner, L.L.C.

(57) ABSTRACT

A method for machine measurement for an NC processing machine is provided. The processing machine has a machine head, for example, a fork head and an associated mechanical and electrical spindle changing interface for holding a motor spindle. A laser interferometer with a beam generator and a beam detector is also provided and at least one measurement optic which interacts with the laser interferometer, for example, in the form of a reflector, and laser interference measurements, which are directed at a measurement optic, in particular distance measurements, carried out for machine measurement. The laser interferometer has an interface which corresponds to the spindle changing interface, and the laser interferometer is substituted for the motor spindle via the spindle changing interface for machine measurement, and is aligned by means of the machine axes for the laser interference measurements.

16 Claims, 4 Drawing Sheets

METHOD FOR MACHINE MEASUREMENT

CROSS-REFERENCE TO RELATED APPLICATIONS

This application claims priority under 35 U.S.C. 119 to German Utility Model Application No. 10 2010 021 839.1, filed May 28, 2010 in the name of Dörries Scharmann Technologie GmbH, the disclosure of which is incorporated by reference herein in its entirety.

FIELD OF THE INVENTION

The present invention relates to a method for machine measurement of an NC processing machine, to a system for machine measurement, and use of the above system for workpiece measurement.

BACKGROUND OF THE INVENTION

The accuracy requirements for processing machines have risen continuously in recent years. Against this background, machine measurement is now of major importance. This relates both to machine measurement when setting up the processing machine and to regular monitoring of the machine accuracy throughout the entire life of the processing machine.

Numerous methods have been disclosed for machine measurement (Textbook "Werkzeugmaschinen—Meβtechnische Untersuchung und Beurteilung", [Machine tools—measurement investigation and assessment], Manfred Weck, 6th Edition, 2001, Springer-Press, Chapter 3 "Geometrisches und kinematisches Verhalten von Werkzeugmaschinen") ([Geometric and Kinematic behaviour of machine tools]).

A major proportion of the known methods are based on the use of laser interferometers for determination of positioning discrepancies, linearity discrepancies, angular discrepancies, or the like.

The known method for machine measurement (WO 2009/030585 A1), on which the invention is based, discloses a vertical processing machine having a permanently installed laser beam generator, whose measurement beam passes through the spindle unit. For this purpose, the spindle is in the form of a hollow spindle, thus allowing the measurement beam to pass through the spindle, for machine measurement.

Beam detectors are provided separately from the single beam generator, and are fixed to the machine bed or to the machine table.

Both the beam generator and the beam detectors are permanently installed in the processing machine. In principle, this makes it possible to carry out an automated machine measurement without having to manually set up any measurement fittings.

The known method is intended for a three-axis vertical machine, as a result of which the measurement beam is always vertical. In order to carry out measurements on the horizontal, work must be carried out with a direction-changing mirror, which can be substituted via the tool interface. In this case, it has been found that the measurement tasks which can be carried out using the known method are restricted. By way of example, additional beam detectors have to be used for a volumetric measurement with the normal diagonal measurement. This leads to a costly, high-maintenance arrangement.

Finally, the known method has the disadvantage that the permanently installed laser beam generator is always subject to the working area constraints, some of which are severe. A major maintenance effort can also be expected here, because of vibration, dirt and moisture.

For the sake of completeness, it should also be noted that a so-called laser tracker is known for machine measurement. A laser tracker such as this is equipped with a laser interferometer, which is arranged on a support. In order to position the laser interferometer, the support has two NC pivoting axes which are arranged at right angles to one another. A suitable sensor arrangement allows the laser interferometer to be slaved to a reflector which is inserted into the tool holder on a processing machine. The absolute position of the machine head of the processing machine can be determined very accurately from the measured distances and the respectively inserted pivot angles. The high level of hardware complexity is disadvantageous, in particular with respect to the two additional NC pivoting axes.

SUMMARY OF THE INVENTION

The invention is based on the problem of refining and developing the known method to allow a high level of flexibility in machine measurement, with a high level of robustness and low costs.

The above problem is solved by a method for machine measurement for an NC processing machine, with the processing machine having a machine head, which is in particular in the form of a fork head, with the machine head having an associated mechanical and electrical spindle changing interface for holding a motor spindle, with a laser interferometer being provided, having a beam generator and a beam detector, and with at least one measurement optics being provided, which interacts with the laser interferometer and in particular is in the form of a reflector, and with laser interference measurements, which are always aligned with a measurement optics, in particular distance measurements, being carried out for machine measurement, with the laser interferometer having an interface which corresponds to the spindle changing interface, and with the laser interferometer being substituted for the motor spindle via the spindle changing interface for machine measurement, and being aligned by means of the machine axes for the laser interference measurements.

In one embodiment, the angular position of the measurement beam, which is associated with the laser interferometer in space, in each case also being adjusted by means of the machine axes during alignment of the laser interferometer.

In another embodiment, the machine head has at least one NC pivoting axis, which is driven for alignment of the laser interferometer, or the machine head has two NC pivoting axes which in particular are aligned at right angles to one another and are driven for alignment of the laser interferometer.

In one embodiment, correction parameters are determined in the course of the machine measurement and are supplied to the positioning system of the processing machine.

In one embodiment, the processing machine has three linear machine axes which are arranged at right angles to one another, and in that some of the laser interference measurements for machine measurement are carried out in a predetermined manner in the working area along the three linear axes, and some of the laser interference measurements are carried out diagonally through the working area, preferably such that the correction parameters are determined from the NC position values and the interferometrically measured distance values.

In one embodiment, the machine head is positioned at a number of predetermined positions in the working area for machine measurement, in that a sensor is provided for detection of the discrepancy in the alignment of the laser interferometer with the respective measurement optics, and the alignment of the laser interferometer is in each case readjusted by means of the machine axes on the basis of the sensor measured values, preferably by determining the correction parameters from the NC position values and the interferometrically measured distance values and/or from the readjustment process.

In one embodiment, a parking station is provided, and the laser interferometer is taken from the parking station before the machine measurement and is substituted in the machine head, and the laser interferometer is inserted into the parking station after completion of the machine measurement, preferably by the substitution being carried out in an automated manner, in the form of a spindle change.

In one embodiment, the parking station has an electrical and mechanical changing interface for the laser interferometer, and, before the start of the machine measurement, the laser interferometer, which is still located in the parking station, is preheated via the electrical part of the changing interface.

The invention also provides a system for machine measurement of an NC processing machine having a machine head, which is in particular in the form of a fork head, with the machine head having an associated mechanical and electrical spindle changing interface for holding a motor spindle, with a laser interferometer being provided, having a beam generator and a beam detector, and with at least one measurement optics being provided, which interacts with the laser interferometer and in particular is in the form of a reflector, and with laser interference measurements, which are always aligned with a measurement optics, in particular distance measurements, being able to be carried out for machine measurement, with the laser interferometer having an interface which corresponds to the spindle changing interface, and with the laser interferometer being substituted for the motor spindle via the spindle changing interface for machine measurement, which laser interferometer can be aligned by means of the machine axes for the laser interference measurements.

In one embodiment, the machine head has at least one NC pivoting axis, which can be driven for alignment of the laser interferometer, or the machine head has two NC pivoting axes which in particular are aligned at right angles to one another and can be driven for alignment of the laser interferometer.

In one embodiment, the processing machine is in the form of a gantry with at least five axes, and the laser interferometer can be positioned by means of the at least five machine axes for machine measurement.

In one embodiment, the electrical part of the spindle changing interface, which is used for the electrical supply and/or driving and/or monitoring of the motor spindle, is used for electrical supply and/or driving and/or monitoring the laser interferometer during the machine measurement.

In one embodiment, the mechanical part of the spindle changing interface, which is used for mechanical fixing of the motor spindle, is used for mechanical fixing of the laser interferometer during the machine measurement.

In one embodiment, the measurement beam of the laser interferometer is aligned with the geometric spindle axis, or the measurement beam of the laser interferometer is aligned at right angles to the geometric spindle axis.

In one embodiment, the invention includes use of a system for workpiece measurement, with the at least one measurement optics, in particular at least one reflector, being positioned on the workpiece, with laser interference measurements, which are always directed at a measurement optics, in particular distance measurements, being carried out for workpiece measurement, and with the laser interferometer being substituted for the motor spindle via the spindle changing interface for workpiece measurement, and being positioned by means of the machine axes for the laser interference measurements.

In one embodiment, the machine head is positioned at a number of predetermined positions in the working area for workpiece measurement, a sensor is provided for detection of the discrepancy in the alignment of the laser interferometer with the respective measurement optics on the workpiece, and the alignment of the laser interferometer is in each case readjusted by means of the machine axes based on the sensor measured values, preferably such that the workpiece parameters are determined from the NC position values and the interferometrically measured distance values and/or from the readjustment process.

BRIEF DESCRIPTION OF THE FIGURES

The invention will be explained in more detail in the following text with reference to a drawing, which illustrates only exemplary embodiments, and in which.

DETAILED DESCRIPTION

Figure 1:
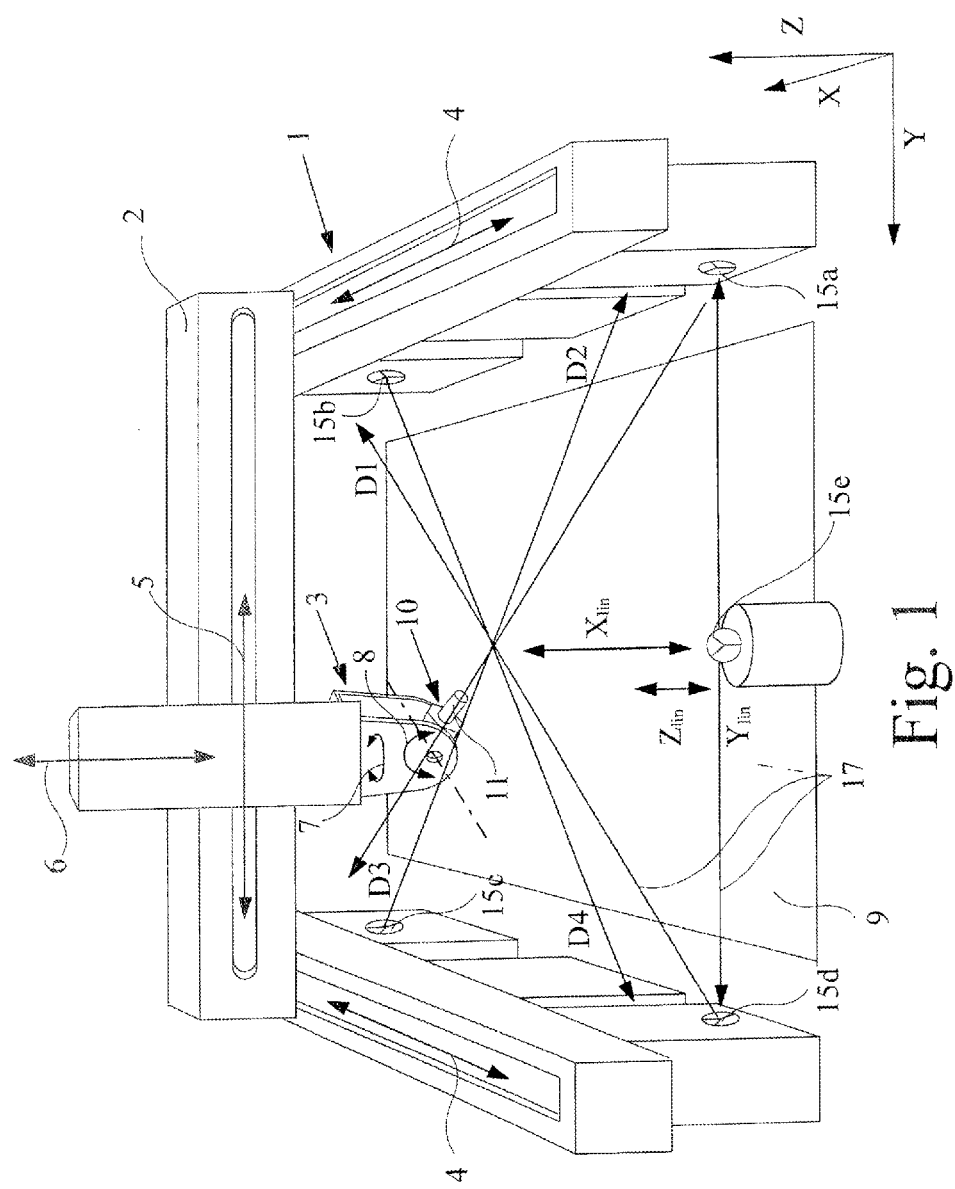
FIG. 1 shows a five-axis processing machine of the gantry type for carrying out a method according to the proposal, with schematically illustrated measurement directions for linear and diagonal measurement.

The method according to the proposal is designed for an NC processing machine having a machine head which has an associated mechanical and electrical spindle changing interface for holding a motor spindle.

It has now become known that the use of the spindle changing interface for fitting the laser interferometer results in a number of advantages, some of which are unexpected.

According to the proposal, the laser interferometer is substituted via the spindle changing interface, which is present in any case, when it is intended to carry out the machine measurement.

The use of the spindle changing interface for substitution of the laser interferometer is advantageous because the spindle changing interface is not only a mechanical interface, but also an electrical interface. This allows the electrical part of the interface to preferably also be used for the laser interferometer.

The substitution of the laser interferometer via the spindle changing interface allows all the movement degrees of freedom of the processing machine to be used for alignment of the laser interferometer for the laser interference measurements. The term "alignment of the laser interferometer" in this case means the alignment of the measurement beam of the laser interferometer. In one particularly preferred refinement, the alignment in the above sense comprises not only parallel movement of the measurement beam, but also a change in the angular position of the measurement beam in space.

In particular, the arrangement of the laser interferometer according to the proposal involves the possibility of aligning the laser interferometer—in any case as well—with an NC pivoting axis or two or more NC pivoting axes of the machine head, in the above sense. It is of interest in this case that the use of such NC pivoting axes entirely avoids the need for direction-changing mirrors.

The solution according to the proposal makes it possible to carry out a virtually unlimited number of measurement tasks with the simple and therefore robust design, by the dual use of already existing components, such as the spindle changing interface and, of course, the machine axes.

One measurement task which can be carried out using the method comprises a volumetric measurement based on measurement of spatial diagonals in accordance with ISO 230-6.

In another measurement task, the processing machine is operated, so to speak, in the form of a laser tracker, with the alignment of the laser interferometer with a measurement optics, in this case in particular a reflector, being readjusted based on sensors. In this case, it is particularly advantageous that the machine axes, which are present in any case, are used for the progressive alignment of the laser interferometer. This dual use of components once again self-evidently leads to particularly high cost efficiency.

The further preferred exemplary embodiments, the equipment of the processing machine includes a parking station, thus allowing the substitution of the laser interferometer to be carried out in an automated manner, in the form of a spindle change. In principle, this allows the machine measurement to be carried out completely automatically.

A system for machine measurement of an NC processing machine is also disclosed. The system according to the proposal is a processing machine as above, into whose spindle changing interface the laser interferometer is substituted, as explained above. In the end, this relates to a processing machine which has been converted to a measurement machine by the substitution of the laser interferometer and the implementation of the above method according to the invention.

Reference may be made to all the statements relating to the above method according to the proposal in their entirety, which statements are suitable for describing the system according to the proposal.

A use of the above system according to the proposal for workpiece measurement is also provided. One important factor here is the knowledge that the processing machine can be used with the laser interferometer substituted into the spindle changing interface, in order to measure the geometry of unprocessed workpieces, and workpieces which have already been processed. For this purpose, it is necessary to position the at least one measurement optics, in this case in particular the at least one reflector, at the relevant points on the workpiece. This results in a particularly extensive dual use of components, in particular of the laser interferometer and of the machine axes, which in the end leads to a very particularly cost-effective arrangement The processing machine illustrated in the drawing is configured such that, as such, it forms a system for machine measurement.

The basic design of the processing machine relates to a five-axis vertical machine of the gantry type. In the preferred exemplary embodiment, the processing machine has a stationary gantry 1 and a movable lateral support 2. In principle, numerous other ways of construction of machine tools can be used for implementation of the method according to the proposal.

The processing machine is in the form of an NC processing machine. It accordingly has an NC controller, which interacts with appropriate position sensors on the respective axes.

In order to carry out a five-axis movement, the processing machine has three NC linear axes 4, 5, 6 as well as two NC pivoting axes 7, 8. In this case, the two NC pivoting axes 7, 8, which are arranged at right angles to one another, are associated with the machine head 3, which is in this case preferably in the form of a fork head.

The drawing also shows a stationary machine table 9. It is also feasible for the machine table 9 to be adjustable by a motor and to provide a part of the linear movement capability or the pivoting capability.

The machine head 3 is equipped with a mechanical and electrical spindle changing interface 10, which is only indicated on the drawing, for holding a motor spindle which is not illustrated, and which is of particular importance in the present case. This will be explained further below.

A laser interferometer 11 with a beam generator 12 and a beam detector 13 is provided for machine measurement. Laser interferometers such as these are known in principle and allow distance changes to be detected very accurately. The principle of this distance measurement is always based on the interference of a measurement beam, reflected on the measurement object, with a reference measurement beam. The best known implementation of a laser interferometer such as this is the Michelson interferometer, in which a so-called retroreflector is arranged on the measurement object. This retroreflector ensures that the transmitted and reflected beams are offset parallel with respect to one another and are caused to interfere only via optics in the interferometer. However, it is also feasible for the measurement beam to be reflected on the measurement object itself.

The solution according to the proposal can be implemented with all forms of laser interferometers. In this case and preferably, the beam generator 12 and the beam detector 13 are accommodated in a common housing 14, which is furthermore preferably designed to be essentially identical to the housing of the motor spindle.

A series of measurement optics 15, in this case reflectors 15, are provided for machine measurement by means of the laser interferometer 11. A different number and arrangement of reflectors 15 can be provided, depending on the measurement task.

A total of five reflectors 15a-15e are provided for the configuration illustrated in FIG. 1, and are arranged at the edge of the working area of the processing machine.

Figure 2:
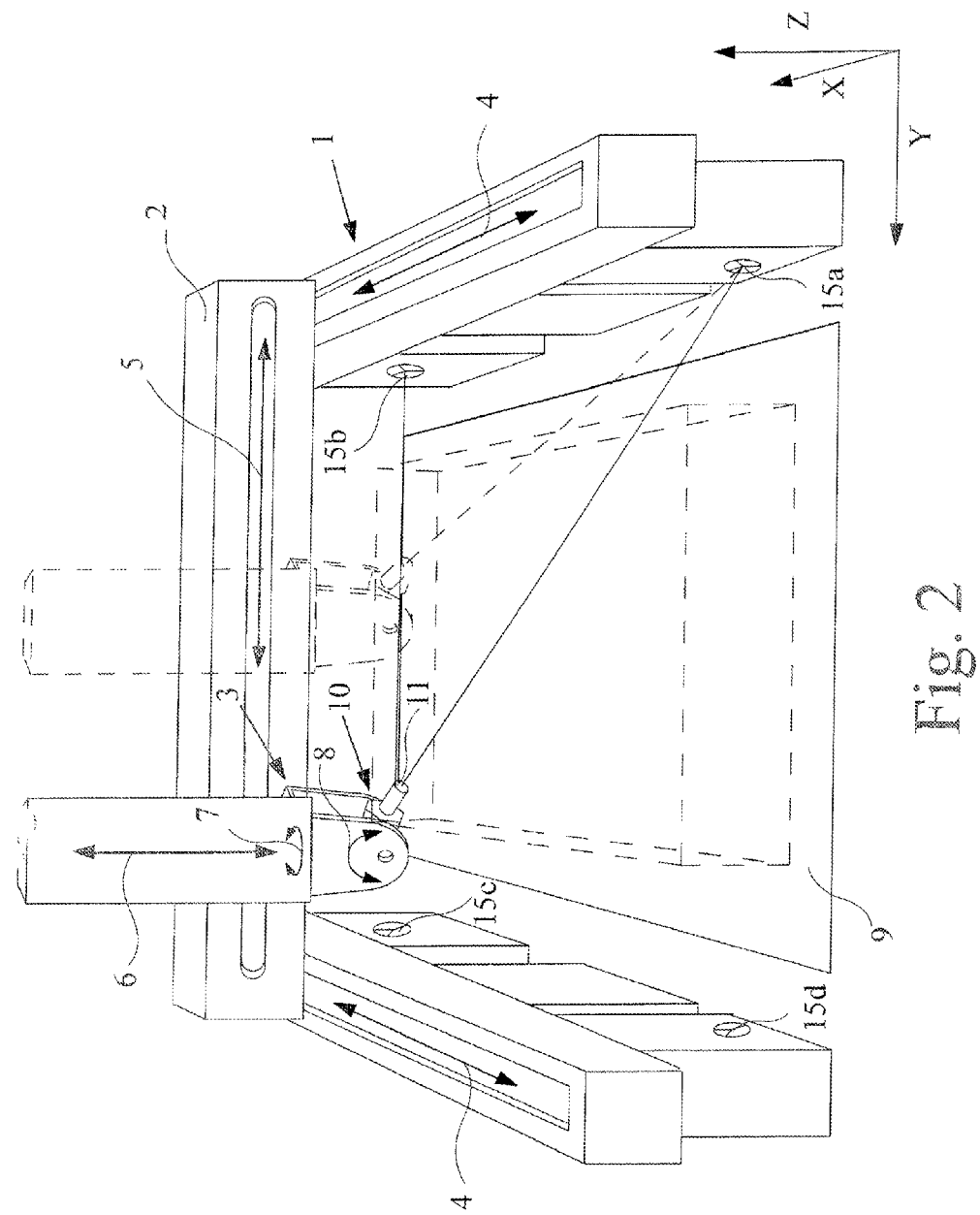
FIG. 2 shows the processing machine as shown in FIG. 1, schematically illustrating measurement positions for a tracker measurement.

The measurement task in the exemplary embodiment illustrated in FIG. 2 means that there is no need for the reflector 15e.

For automated machine measurement, the proposal advantageously provides for the reflectors 15 to be arranged fixed to the processing machine. If required, a cover or the like can be provided for the respective reflector 15, and should be correspondingly removed for the machine measurements.

Figure 3:
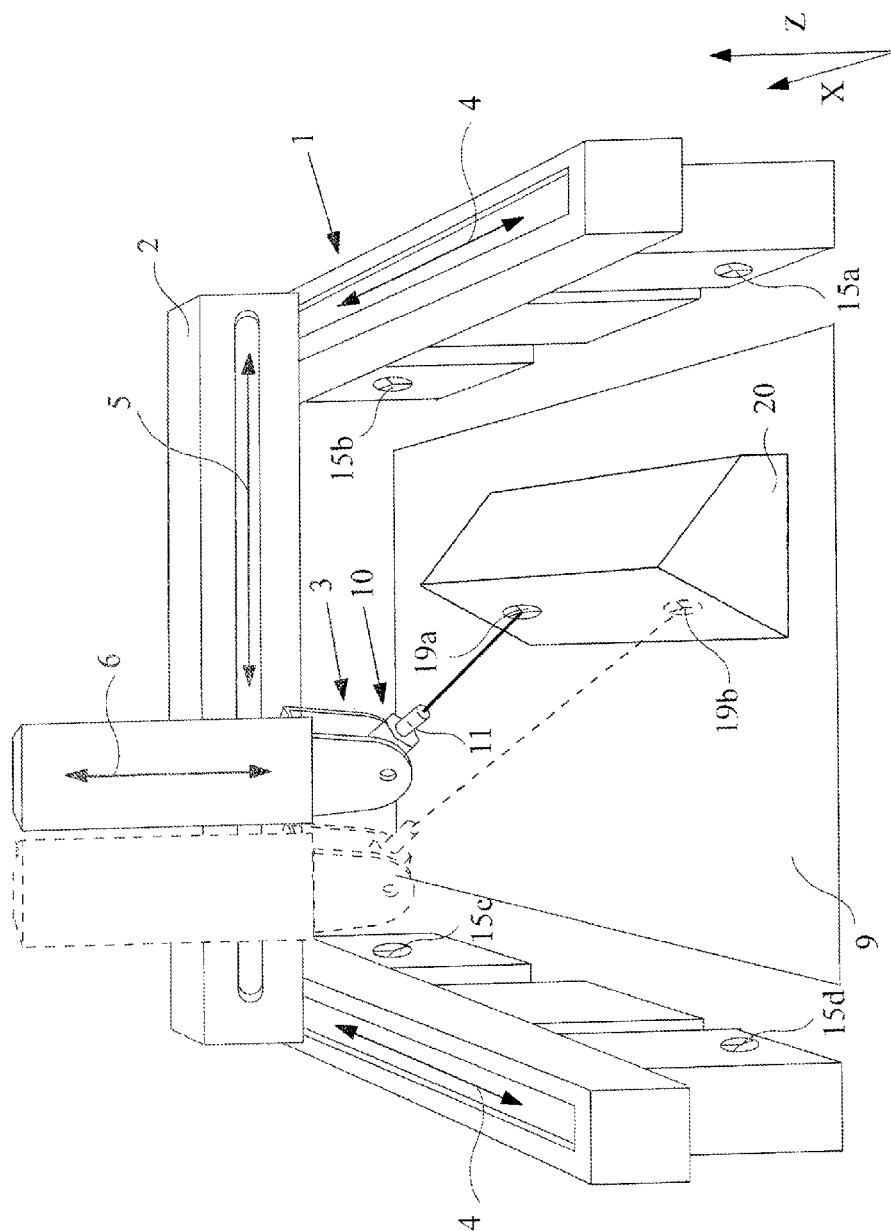
FIG. 3 shows the processing machine as shown in FIG. 1 during workpiece measurement.

It is now of interest that the laser interferometer 11 has an interface 16, which corresponds to the spindle changing interface 10 and is likewise only indicated in the drawing, with FIGS. 1 to 3 showing the laser interferometer 11 already having been substituted for the motor spindle via the spindle changing interface 10, which laser interferometer 11 can be aligned by means of the machine axes 4-8 for the laser interference measurements.

In the above sense, the alignment of the laser interferometer 11 in this case preferably comprises not only parallel movements of the measurement beam, but also changes to the angular position of the measurement beam in space, as has been explained in the general part of the description.

A glance at the drawing shows that, because of the five axes and in particular because of the configuration of the machine head 3 with two NC pivoting axes 7, 8, there are now degrees of freedom for carrying out measurement tasks. This has been explained in the general part of the description.

Similar advantages can be achieved if the machine head 3 has only a single NC pivoting axis 7, 8, which is preferably provided by means of a fork head. In this case, the pivoting axis 7, 8 is preferably configured such that its operation allows alignment of the laser interferometer 11 in the above sense.

In principle, the method according to the invention may, however, also advantageously be used on a processing machine which has no NC pivoting axis in the machine head 3.

In order to achieve the degrees of freedom, as mentioned further above, for carrying out the measurement tasks with the two last-mentioned refinements as well, the proposal preferably provides for the at least one measurement optics 15 to be arranged on a measurement table, which can be pivoted on one pivoting axis or on two pivoting axes.

It is now essential for the method according to the proposal that the laser interferometer 11 can be substituted for the motor spindle via the spindle changing interface 10 for machine measurement, and can be aligned by means of the machine axes 4-8 for the laser interference measurements. The laser interferometer 11 is preferably substituted in an automated manner in the form of a spindle change, as has likewise also been explained. In principle, however, it is also possible to substitute the laser interferometer 11 manually.

In the course of the machine measurement, correction parameters are in this case determined in an entirely general form, and are supplied to the positioning system of the processing machine. This can be done in various ways. In one particularly preferred refinement, the correction parameters are determined on the basis of the machine axes and are mixed into the measured value from the position sensor associated with the respective machine axis. However, it is also feasible for the correction parameters to be supplied to the machine controller, where they are taken into account appropriately in the course of path planning or the like.

FIG. 1 schematically illustrates a measurement task being carried out, comprising diagonal measurements in accordance with ISO 230-6. This is based on the assumption that the processing machine has three linear machine axes 4, 5, 6, which are arranged at right angles to one another, which is obviously the case with the illustrated processing machine. It is also important for some of the laser interference measurements for machine measurement to be carried out in a predetermined manner in the working area along the three linear axes 4, 5, 6, and for some of the laser interference measurements to be carried out diagonally through the working area.

In detail, the intention is first of all to align the laser interferometer 11 with one of the reflectors 15, and then to move on a linear measurement path 17, while maintaining this alignment. In this case, the measurement path is predetermined, in particular programmed, such that the alignment of the laser interferometer 11 with the one reflector 15 remains unchanged, without any sensor-based readjustment being required.

Depending on the detail configuration, the movement on the measurement path 17 for distance measurement can be stopped at least once, preferably cyclically. However, it is also feasible for the distance measurements to be carried out dynamically, that is to say while moving on the measurement path 17. In this case, the correction parameters can be determined from the NC position values and the interferometrically measured distance values. "NC position value" in each case means the position value which is used in the NC control system as the basis for driving the respective machine axis 4-8.

As can be seen from the illustration in FIG. 1, three measurement paths 17 are in each case provided along the three linear axes 4, 5, 6, and four diagonal measurement paths 17 (D1-D4).

FIG. 2 schematically illustrates a further measurement task being carried out. In this further measurement task, the machine head 3 is positioned at a number of predetermined positions in the working area, which are indicated in FIG. 2 by a volume represented by dashed lines.

In this case, the tool reference point is preferably used as a reference point. The important factor here is that a sensor, which is not illustrated, is provided in order to detect the discrepancy in the alignment of the laser interferometer 11 with the respective measurement optics 15, in this case the respective reflector 15. Sensors such as these have become known in the field of laser trackers. An optical position sensor (PSD, Position Sensitive Detector) is advantageously used here, by means of which the two-dimensional position of a light point on a sensor platelet can be determined.

According to the proposal, the alignment of the laser interferometer 11 is now in each case readjusted on the basis of the sensor measured values, by means of the machine axes 4-8. During the positioning of the machine head 3, the configuration of the machine axes 4-8 is therefore readjusted such that the laser interferometer 11 is still aligned with the respective reflector 15. The correction parameters can then be determined from the NC position values and the interferometrically measured distance values and/or from the readjustment process.

As has already been mentioned, the method according to the proposal allows automated machine measurement, without any problems. In one particularly preferred refinement, a parking station, which is not illustrated, is provided for this purpose, with the laser interferometer 11 being taken from the parking station before the machine measurement, and being substituted in the machine head 3, and with the laser interferometer 11 being inserted into the parking station again after completion of the machine measurement. In one particularly preferred refinement, the substitution process is carried out in an automated manner, in the form of a spindle change.

It is self-evident that the motor spindle must be replaced before the substitution of the laser interferometer 11. A second parking station, which corresponds to the motor spindle, is preferably provided for this purpose. Because of the fact that the motor spindle and the laser interferometer 11 preferably have at least partially identical interfaces, the two parking stations can even be designed to be identical.

In one particularly preferred refinement, the parking station has an electrical and mechanical changing interface for the laser interferometer 11. In this case, it is preferable, before the start of the machine measurement, for the laser interferometer 11, which is still located in the parking station, to be preheated via the electrical part of the changing interface. This allows the laser interferometer 11 to be preheated, for example, even before a time at which a processing job is still being carried out by the processing machine.

According to a further teaching, which is likewise significant in its own right, a system is claimed for machine measurement. The important factor in this case is that a laser interferometer 11 is inserted in the above manner into the spindle changing interface 10, and can be aligned by means of the machine axes 4-8 for the laser interference measurements.

To this extent, reference may first of all be made to the above explanatory notes relating to the method according to the proposal.

It has been found to be particularly advantageous for the processing machine to be a gantry type, in which case the laser interferometer 11 for machine measurement can be aligned by means of the at least five machine axes 4-8. However, in principle, other types of machine can also be used here.

In the present case, the configuration of the spindle changing interface 10, or the interfaces 16 which correspond thereto, of the motor spindle of the laser interferometer 11 are also of interest. According to the proposal, the electrical part of the spindle changing interface 10, which is used for the electrical supply and/or driving and/or monitoring of the motor spindle, is used for electrical supply and/or driving and/or monitoring of the laser interferometer 11 during the machine measurement, that is to say when the laser interferometer 11 has been substituted. The electrical part of the spindle changing interface 10 is correspondingly used in a dual form, which is particularly advantageous for cost reasons.

A similar situation applies for the mechanical part of the spindle changing interface 10. In this case, the mechanical part of the spindle changing interface 10, which is used for mechanical fixing of the motor spindle, during the machine measurement, that is to say when the laser interferometer 11 has been substituted, is intended for mechanical fixing of the laser interferometer 11. The mechanical part of the spindle changing interface 10 is correspondingly also advantageously used for a dual purpose.

Figure 4:
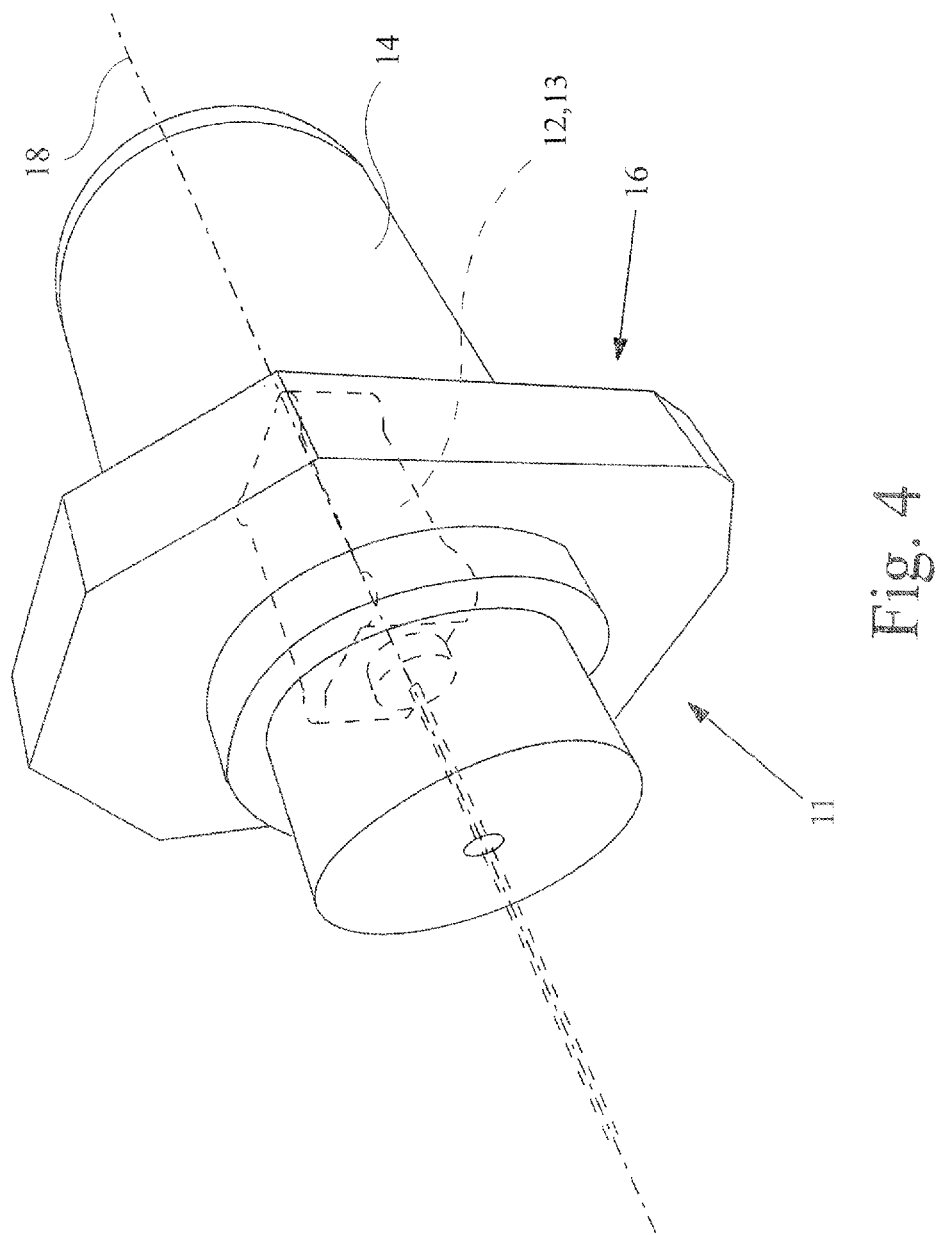
FIG. 4 shows the laser interferometer in a system according to the proposal for machine measurement, illustrated entirely schematically.

FIG. 4 shows the alignment of the measurement beam of the laser interferometer 11 with the geometric spindle axis 18, which is likewise indicated in FIG. 4. However, in principle, it is also feasible for the measurement beam to be aligned at right angles to the geometric spindle axis 18. In the case of the illustrated vertical processing machine, the last-mentioned variant is advantageous, since the measurement tasks which are illustrated in FIGS. 1 and 2 can be carried out in axis configurations in which the NC pivoting axes 7, 8 may be deflected only slightly from their mid-position.

According to a further teaching, which is likewise important in its own right, the use of the system described above is claimed for workpiece measurement. It has become known that the processing machine itself can be used, with simple measures, as a measurement machine for workpiece measurement.

According to this further teaching, it is important that at least one measurement optics 19, in this case at least one reflector 19, is positioned on the workpiece 20, with laser interference measurements, in particular distance measurements, which are always aligned with measurement optics 19, being carried out for workpiece measurement, and with the laser interferometer 11 being substituted for the motor spindle via the spindle changing interface 10 for workpiece measurement, and being aligned by means of the machine axes 4-8 for the laser interference measurements (FIG. 3). The geometric workpiece data of interest can be derived from the interferometrically measured distance values, and from the NC position values.

In one particularly preferred refinement, the processing machine operates in the form of a laser tracker for workpiece measurement. Correspondingly, the proposal also first of all provides here for the machine head 3 to be positioned at a number of predetermined positions in the working area.

Furthermore, in this case as well, a sensor as described further above is provided for detection of the discrepancy in the alignment of the laser interferometer 11 with the respective measurement optics 19, in this case the respective reflector 19, on the workpiece 20, with the alignment of the laser interferometer 11 in each case being readjusted on the basis of the sensor measured values, by means of the machine axes 4-8. The workpiece parameters can then preferably be determined from the interferometrically measured distance values, and from the NC position values, and/or from the readjustment process.

The invention claimed is:

1. A method for machine measurement for an NC processing machine, wherein the processing machine includes a machine head having an associated mechanical and electrical spindle changing interface for holding a motor spindle, the method comprising:
   providing a laser interferometer having a beam generator and a beam detector,
   providing at least one measurement optics which interacts with the laser interferometer,
   providing laser interference measurements that are always aligned with a measurement optics and that are being carried out for machine measurement,
   providing the laser interferometer with an interface which corresponds to the spindle changing interface,
   substituting the laser interferometer for the motor spindle via the spindle changing interface for machine measurement, and
   aligning the laser interferometer by means of the machine axes for the laser interference measurements.

2. The method according to claim 1, wherein the angular position of the measurement beam, which is associated with the laser interferometer in space, in each case is adjusted by means of the machine axes during alignment of the laser interferometer.

3. The method according to claim 1, wherein the machine head has at least one NC pivoting axis, which is driven for alignment of the laser interferometer, or the machine head has two NC pivoting axes which are aligned at right angles to one another and are driven for alignment of the laser interferometer.

4. The method according to claim 1, wherein correction parameters are determined in the course of the machine measurement and are supplied to the positioning system of the processing machine.

5. The method according to claim 1, wherein the processing machine has three linear machine axes which are arranged at right angles to one another, and some of the laser interference measurements for machine measurement are carried out in a predetermined manner in the working area along the three linear axes, and some of the laser interference measurements are carried out diagonally through the working area.

6. The method according to claim 1, wherein the machine head is positioned at a number of predetermined positions in the working area for machine measurement, a sensor is provided for detection of the discrepancy in the alignment of the laser interferometer with the respective measurement optics, and the alignment of the laser interferometer is in each case readjusted by means of the machine axes on the basis of the sensor measured values.

7. The method according to claim 1, wherein a parking station is provided, and the laser interferometer is taken from the parking station before the machine measurement and is substituted in the machine head, and the laser interferometer is inserted into the parking station after completion of the machine measurement.

8. The method according to claim 7, wherein the parking station has an electrical and mechanical changing interface for the laser interferometer, and before the start of the machine measurement, the laser interferometer, which is still located in the parking station, is preheated via the electrical part of the changing interface.

9. A system for machine measurement of an NC processing machine having a machine head with an associated mechanical and electrical spindle changing interface for holding a motor spindle, with a laser interferometer having a beam generator and a beam detector, and at least one measurement optics which interacts with the laser interferometer and with laser interference measurements which are always aligned with a measurement optics and which are being carried out for machine measurement, with the laser interferometer having an interface which corresponds to the spindle changing interface, and with the laser interferometer being substituted for the motor spindle via the spindle changing interface for machine measurement, which laser interferometer can be aligned by means of the machine axes for the laser interference measurements.

10. The system according to claim 9, wherein the machine head has at least one NC pivoting axis, which can be driven for alignment of the laser interferometer, or the machine head has two NC pivoting axes which are aligned at right angles to one another and can be driven for alignment of the laser interferometer.

11. The system according to claim 9, wherein the processing machine is in the form of a gantry with at least five axes, and the laser interferometer can be positioned by means of the at least five machine axes for machine measurement.

12. The system according to claim 9, wherein the electrical part of the spindle changing interface, which is used for one or more of electrical supply, driving, and monitoring of the motor spindle, is used for one or more of electrical supply, driving and monitoring of the laser interferometer during the machine measurement.

13. The system according to claim 9, wherein the mechanical part of the spindle changing interface, which is used for mechanical fixing of the motor spindle, is used for mechanical fixing of the laser interferometer during the machine measurement.

14. The system according to claim 9, wherein the measurement beam of the laser interferometer is aligned with the geometric spindle axis, or the measurement beam of the laser interferometer is aligned at right angles to the geometric spindle axis.

15. The system according to claim 9, wherein it is used for workpiece measurement, with the at least one measurement optics being positioned on the workpiece, with laser interference measurements, which are always directed at a measurement optics being carried out for workpiece measurement, and with the laser interferometer being substituted for the motor spindle via the spindle changing interface for workpiece measurement, and being positioned by means of the machine axes for the laser interference measurements.

16. The system according to claim 15, wherein the machine head is positioned at a number of predetermined positions in the working area for workpiece measurement, a sensor is provided for detection of the discrepancy in the alignment of the laser interferometer with the respective measurement optics on the workpiece, and the alignment of the laser interferometer is in each case readjusted by means of the machine axes based on the sensor measured values.

* * * * *